(12) United States Patent
Hoshi

(10) Patent No.: US 7,133,214 B2
(45) Date of Patent: Nov. 7, 2006

(54) ZOOM LENS SYSTEM AND IMAGE-TAKING APPARATUS HAVING THE SAME

(75) Inventor: Koji Hoshi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 10/891,621

(22) Filed: Jul. 15, 2004

(65) Prior Publication Data
US 2005/0024738 A1   Feb. 3, 2005

(30) Foreign Application Priority Data
Aug. 1, 2003   (JP) .............................. 2003-284982

(51) Int. Cl.
*G02B 15/14* (2006.01)
(52) U.S. Cl. ...................... 359/687; 359/683
(58) Field of Classification Search ................ 359/687, 359/676, 683–685
See application file for complete search history.

(56) References Cited
U.S. PATENT DOCUMENTS 4,634,236 A * 1/1987 Masumoto ................. 359/684
4,859,042 A * 8/1989 Tanaka ...................... 359/684
5,963,378 A 10/1999 Tochigi et al. ............. 359/687
6,166,864 A 12/2000 Horiuchi .................... 359/687
2003/0202258 A1* 10/2003 Hozumi et al. ............. 359/687
2003/0227691 A1* 12/2003 Saruwatari .................. 359/687

FOREIGN PATENT DOCUMENTS

| JP | 7270684 | 10/1995 |
| JP | 7318804 | 12/1995 |
| JP | 11305124 | 11/1999 |

* cited by examiner

*Primary Examiner*—Jordan M. Schwartz
(74) *Attorney, Agent, or Firm*—Morgan & Finnegan, L.L.P.

(57) ABSTRACT

A zoom lens system is disclosed, comprising, in order from an object side to an image side, a first lens unit with a positive refractive power, a second lens unit with a negative refractive power, a third lens unit with a positive refractive power, and a fourth lens unit with a positive refractive power, wherein a distance between the respective lens units is changed during zooming. The third lens unit consists of, in order from the object side to the image side, a first lens sub-unit including a positive lens with an object-side surface which has a convex shape and having a positive refractive power, an aperture stop, a second lens sub-unit including a negative lens and having a negative optical power, and a third lens sub-unit including a positive lens and having a positive optical power.

3 Claims, 5 Drawing Sheets

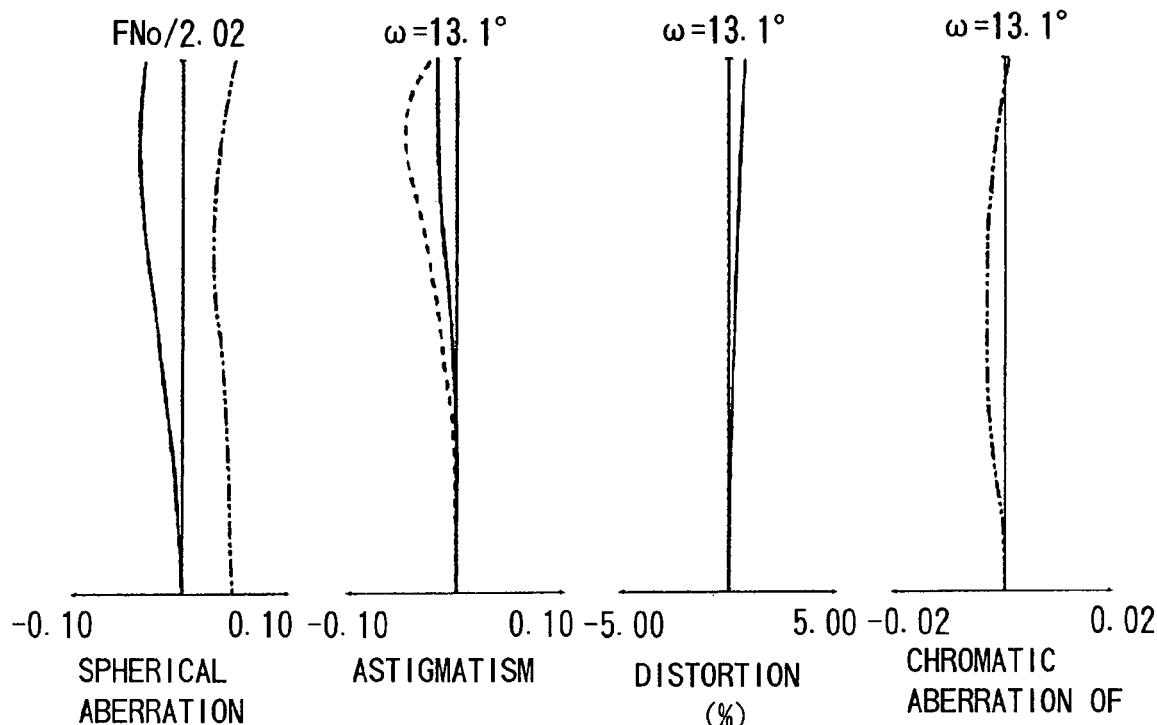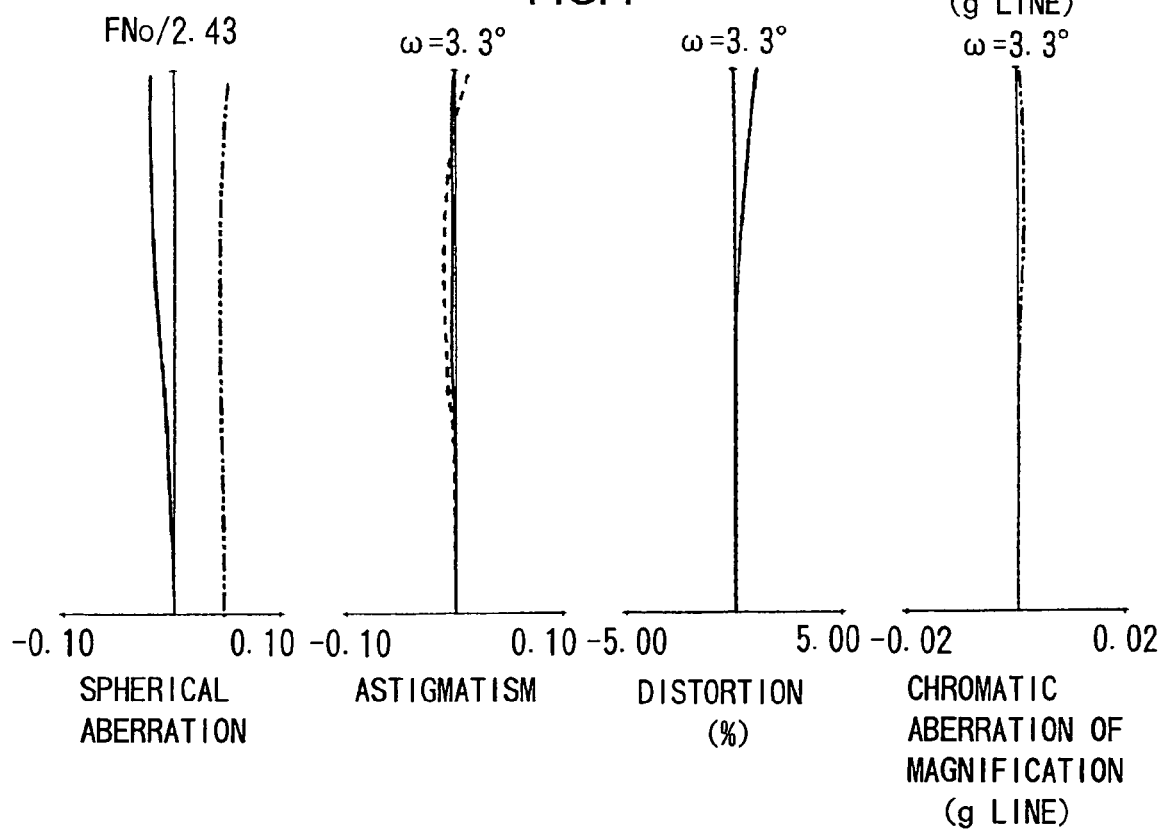

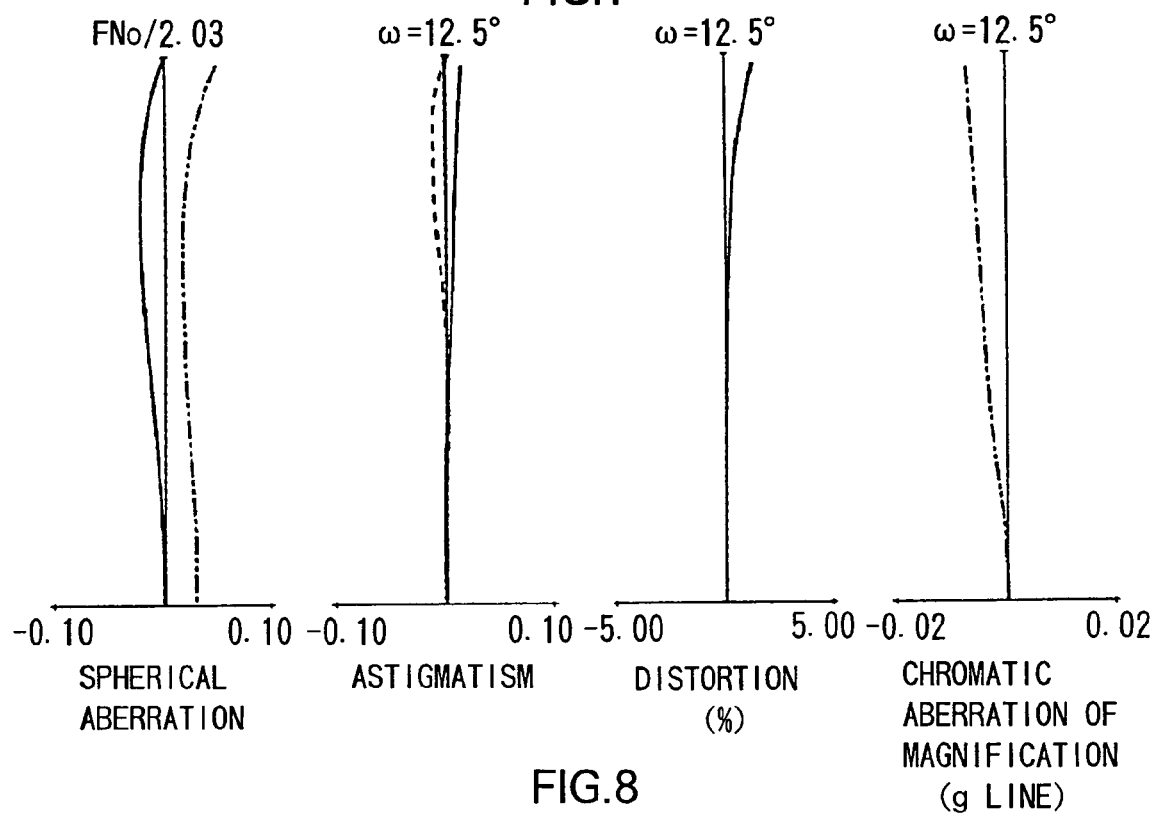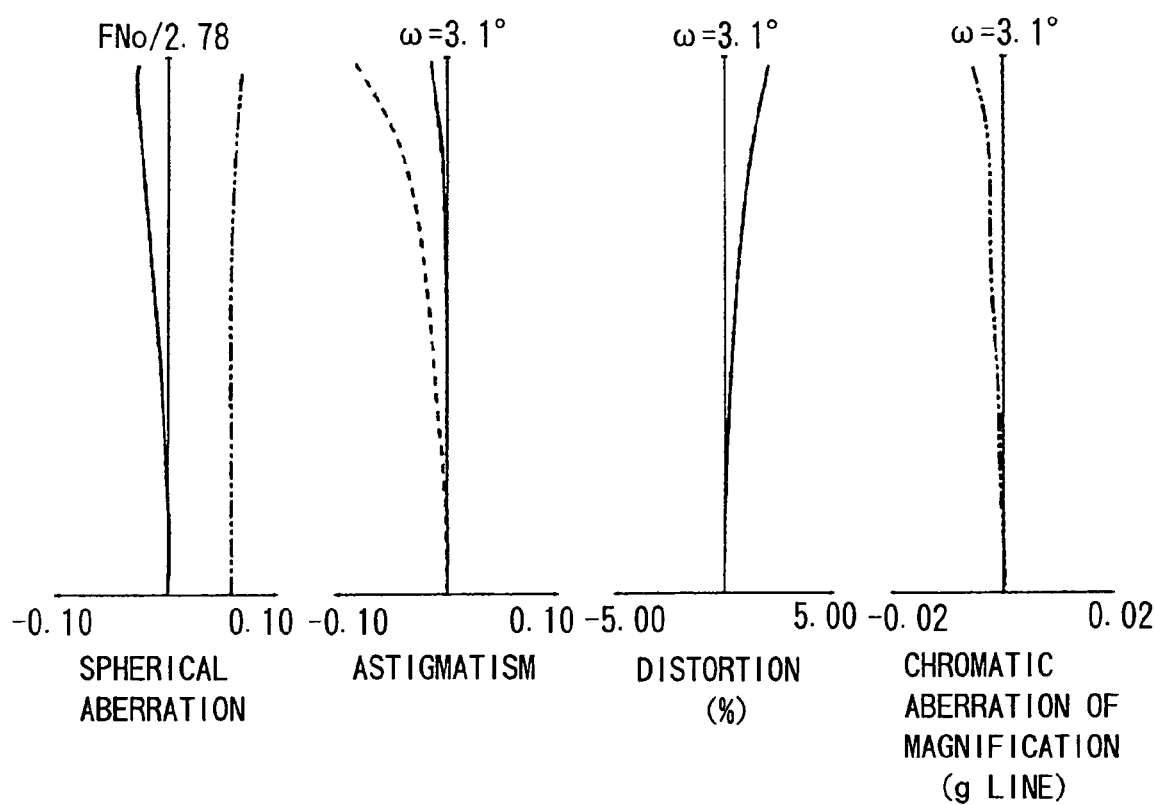

ZOOM LENS SYSTEM AND IMAGE-TAKING APPARATUS HAVING THE SAME

This application claims priority from Japanese Patent Application No. 2003-284982 filed on Aug. 1, 2003, which is hereby incorporated by reference.

BACKGROUND OF THE INVENTION

1. Field of the Invention

The present invention relates to a zoom lens system, particularly preferable for use as an image-taking optical system of a video camera, a digital still camera, and the like.

2. Description of the Related Art

In recent years, as enhanced functionality and a smaller size are achieved in an image-taking apparatus such as a video camera and a digital still camera which uses a solid-state image-pickup device, both higher optical performance and a smaller size are needed in an image-taking optical system used in such an image-taking apparatus.

A known zoom lens (a variable magnification optical system) used in such an image-taking apparatus is of a four-unit structure with a positive, a negative, a positive, and a positive refractive powers. The zoom lens has, in order from an object side to an image side, a first lens unit with a positive refractive power stationary during zooming and focusing, a second lens unit with a negative refractive power which moves on an optical axis to provide variable magnification, a third lens unit with a positive refractive power stationary during zooming and focusing, and a fourth lens unit with a positive refractive power which moves during zooming and focusing. For example, each of Patent Document 1, Patent Document 2, and Patent Document 3 discloses a zoom lens in which a second lens unit provides variable magnification and a fourth lens unit corrects variations in image surface position associated with varied magnification. The zoom lens disclosed in each of Patent Documents 1 to 3 has an aperture stop disposed immediately before a third lens unit.

(Patent Document 1)

Japanese Patent Application Laid-Open No. 7-270684 (No. 1995-270684) (corresponding to U.S. Pat. No. 5,963,378)

(Patent Document 2)

Japanese Patent Application Laid-Open No. 7-318804 (No. 1995-318804) (corresponding to U.S. Pat. No. 5,963,378)

(Patent Document 3)

Japanese Patent Application Laid-Open No. 11-305124 (No. 1999-305124) (corresponding to U.S. Pat. No. 6,166,864)

In recent years, with a smaller size of an image-taking apparatus such as a digital still camera and a video camera and a higher number of pixels of an image-pickup device, both higher optical performance and a smaller size are needed in an image-taking optical system used in such an image-taking apparatus. In addition, in a video camera, recording of still images of high quality is desired, and higher optical performance is required than in an image-taking optical system intended only for taking moving images. At the same time, a lens system with the size maintained at the current level or a smaller size is needed.

Generally, in a zoom lens, increasing a refractive power of each lens unit can reduce a movement amount of each lens unit for providing a predetermined zoom ratio to achieve a higher zoom ratio and a smaller overall length of the lenses.

Simply increasing a refractive power of each lens unit, however, presents a problem that exacting tolerances are needed in manufacture. For example, if relative axial displacement occurs in lenses within the third lens unit in the four unit zoom lens with the positive, the negative, the positive, and the positive refractive powers as described above, image quality is significantly degraded.

SUMMARY OF THE INVENTION

The present invention has been made in view of such a problem of the conventional zoom lenses, and it is an object of the present invention to provide a zoom lens which has a small size and high optical performance as the entire lens system, and at the same time, has a simple structure with a small number of constituent lenses.

In accordance with one aspect of present invention, a zoom lens system comprises, in order from an object side to an image side, a first lens unit having a positive refractive power, a second lens unit having a negative refractive power, a third lens unit having a positive refractive power, and a fourth lens unit having a positive refractive power, wherein a distance between the respective lens units is changed during zooming. The third lens unit consists of, in order from the object side to the image side, a first lens sub-unit including a positive lens with an object-side surface which has a convex shape and having a positive refractive power, an aperture stop, a second lens sub-unit including a negative lens and having a negative optical power, and a third lens sub-unit including a positive lens and having a positive optical power.

The distance between the first lens sub-unit and second lens sub-unit, the distance between the second lens sub-unit and third lens sub-unit, and the thickness of the third lens unit on an optical axis are appropriately set.

BRIEF DESCRIPTION OF THE DRAWINGS

FIG. 3 shows various types of aberration in the zoom lens of Embodiment 1 at an intermediate zoom position;

FIG. 4 shows various types of aberration in the zoom lens of Embodiment 1 at the telephoto end;

FIG. 7 shows various types of aberration in the zoom lens of Embodiment 2 at an intermediate zoom position;

FIG. 8 shows various types of aberration in the zoom lens of Embodiment 2 at the telephoto end;

DETAILED DESCRIPTION OF THE PREFERRED EMBODIMENTS

Embodiments of a zoom lens and an image-taking apparatus of the present invention are hereinafter described with reference to the drawings.

Figure 1:
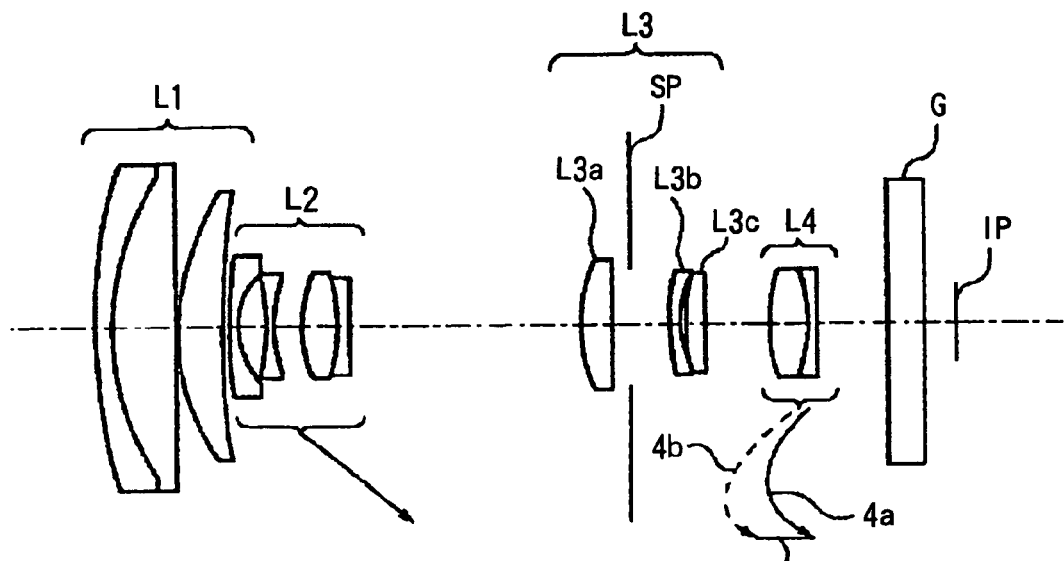
FIG. 1 is a section view showing lenses of a zoom lens of Embodiment 1.
Figure 2:
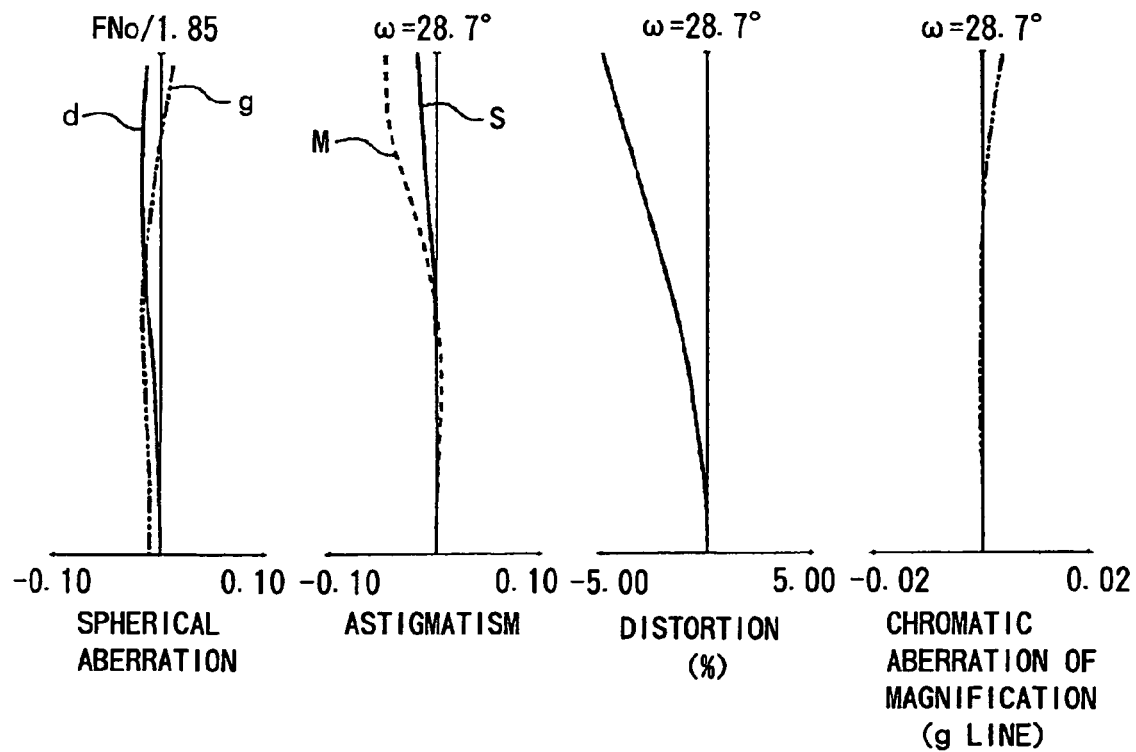
FIG. 2 shows various types of aberration in the zoom lens of Embodiment 1 at the wide-angle end.

FIG. 1 is a section view showing main portions of a zoom lens of Embodiment 1. FIGS. 2 to 4 show various types of aberration in the zoom lens of Embodiment 1 at the wide-angle end, an intermediate zoom position, and the telephoto end, respectively.

Figure 5:
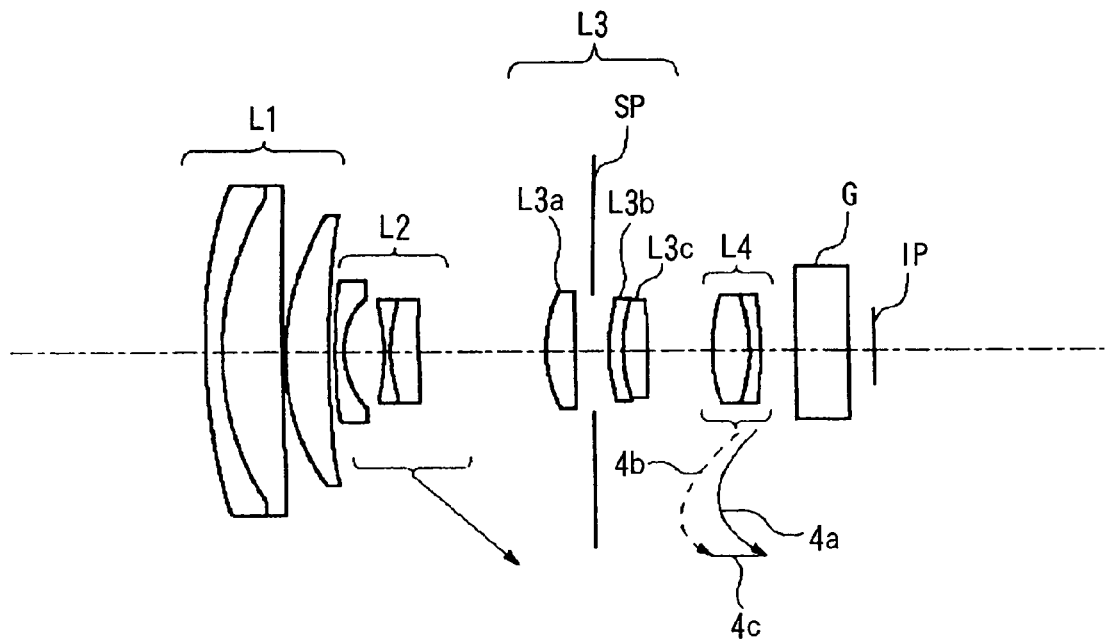
FIG. 5 is a section view sowing lenses of a zoom lens of Embodiment 2.
Figure 6:
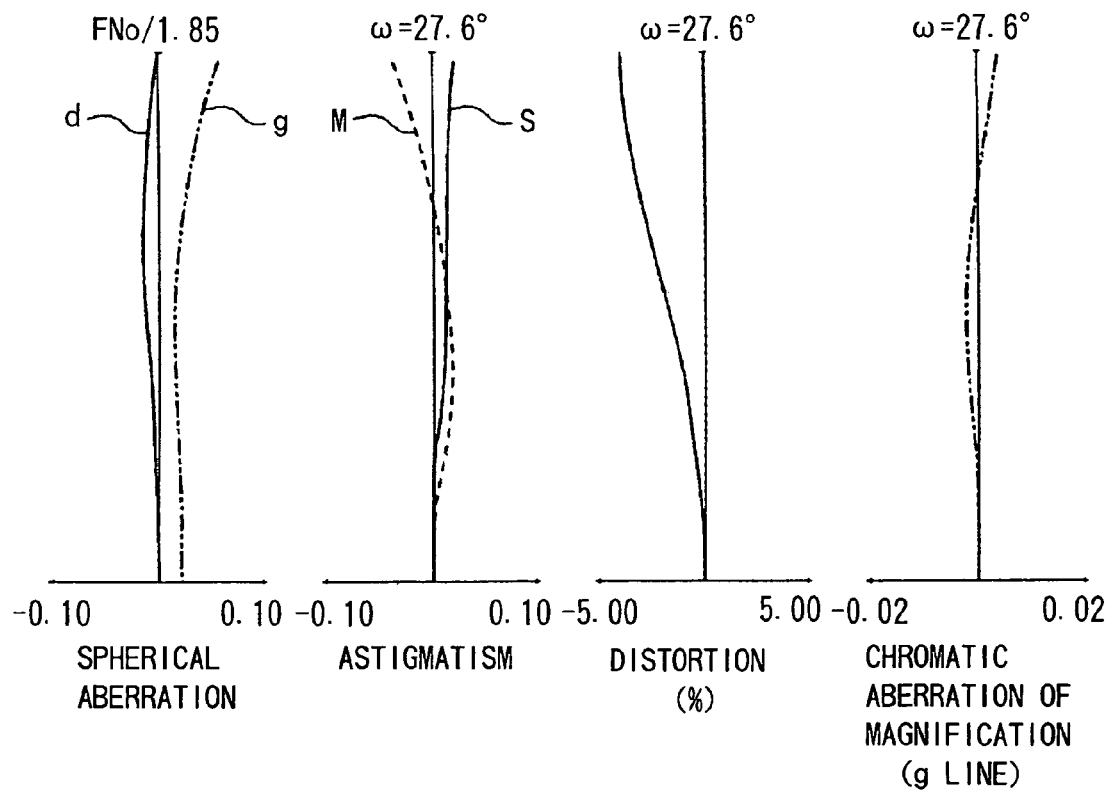
FIG. 6 shows various types of aberration in the zoom lens of Embodiment 2 at the wide-angle end.

FIG. 5 is a section view showing main portions of a zoom lens of Embodiment 2. FIGS. 6 to 8 show various types of aberration in the zoom lens of Embodiment 2 at the wide-angle end, an intermediate zoom position, and the telephoto end, respectively.

The zoom lens of each of Embodiments 1 and 2 is an image-taking lens system for use in an image-taking apparatus. In the section views of the lenses, the left hand corresponds to an object side (front), while the right hand corresponds to an image side (rear).

In the section views of FIGS. 1 and 5, L1 shows a first lens unit which is not moved for zooming or focusing and has a positive refractive power (that is, an optical power or the reciprocal of a focal length), L2 shows a second lens unit which is moved for zooming and is not moved for focusing and has a negative refractive power, L3 shows a third lens unit which is not moved for zooming or focusing and has a positive refractive power, and L4 shows a fourth lens unit which is moved for zooming and focusing and has a positive refractive power. The third lens unit L3 is formed of three lens components, that is, a first lens sub-unit L3a, a second lens sub-unit L2b, and a third lens sub-unit L3c which has a positive refractive power. SP shows an aperture stop which is disposed between the first lens sub-unit L3a and the second lens sub-unit L3b. G shows a glass block provided in design corresponding to a filter such as an infrared cut filter and an optical low pass filter or a face plate. IP shows an image surface on which a photosurface of a solid-state image-pickup device (a photoelectrical conversion element) such as a CCD sensor and a CMOS sensor is located.

In spherical aberration of each aberration diagram of FIGS. 2 to 4 and FIGS. 6 to 8, a solid line shows a d line and a chain double-dashed line shows a g line. In aspheric aberration of each aberration diagram, a solid line shows a sagittal ray, a broken line shows a meridional ray. In chromatic aberration of magnification of each aberration diagram, a chain double-dashed line shows a g line. ω represents half of the field angle.

In the zoom lenses of Embodiments 1 and 2, the second lens unit L2 is moved toward the image side to provide variable magnification as shown by an arrow in each of FIGS. 1 and 5 during zooming from the wide-angle end to the telephoto end. In addition, the fourth lens unit L4 is moved to have part of a convex trajectory against the object side to correct image surface variations associated with varied magnification.

The zoom lenses of Embodiments 1 and 2 employ a rear focusing scheme in which the fourth lens unit L4 is moved on an optical axis to achieve focusing. A curved solid line 4a and a curved broken line 4b for the fourth lens unit L4 in each of FIGS. 1 and 5 show trajectories of movement for correcting image surface variations during zooming from the wide-angle end to the telephoto end when the zoom lens is focused on an object at infinity and on an object at a short distance, respectively. The fourth lens unit L4 is moved to have the convex trajectories against the object side in this manner to effectively use the space between the third lens unit L3 and the fourth lens unit L4 to advantageously achieve a reduction in the overall length of the lenses.

In each of Embodiments 1 and 2, for example, when the zoom lens is focused on an object at a short distance from an object at infinity at the telephoto end, the fourth lens unit L4 is moved forward as shown by a straight line 4c in each of the lens section views.

The structure in which the first lens unit L1 is not moved for zooming or focusing allows the barrel mechanism to be reduced in size and realized easily with resistance to static pressure. In addition, the structure in which the third lens unit L3 is not moved for zooming or focusing enables the barrel mechanism to be reduced in size with a simple structure and to be realized readily with less axial displacement errors.

Each of Embodiments 1 and 2 has optical performance for supporting a solid-state image-pickup device such as a CCD sensor and a CMOS sensor with a cell pitch of approximately 2 to 3 microns.

In each of Embodiments 1 and 2, the third lens unit L3 is formed, in order from the object side to the image side, of the first lens sub-unit L3a including a positive lens 3G1 with an object-side surface which has a convex shape and having a positive refractive power, the aperture stop SP, the second lens sub-unit L3b including a negative lens 3G2 with an image-side surface which has a concave shape and having a negative refractive power, and the third lens sub-unit L3c including a positive lens 3G3 with an object-side surface which has a convex shape and having a positive refractive power. The object-side surface of the positive lens 3G1 is an aspheric surface.

In a zoom lens formed of four lens units in which an aperture stop SP is often disposed immediately before a third lens unit L3, the placement of the aperture stop SP puts a limitation to prevent an increase in the movement amount of a second lens unit L2. In contrast, in Embodiment 1, the aperture stop SP is disposed within the third lens unit L3 to enhance the use efficiency of space required during zooming, thereby achieving a higher zoom ratio than the conventional lenses and a reduction in the overall length of the lenses.

The spacing provided for disposing the aperture stop SP between the first lens sub-unit L3a and the second lens sub-unit L3b reduces degraded optical performance due to relative axial displacement of the first lens sub-unit L3a and the second lens sub-unit L3b in the third lens unit L3. Since the structure has the principal point of the third lens unit L3 positioned relatively close to the second lens unit L2, the distance from the third lens unit L3 to the image surface can be reduced. This readily allows a reduction in the overall length of the lenses.

The structure in which the second lens sub-unit L3b and the third lens sub-unit L3c are separately provided allows aberration produced at the final surface of the second lens sub-unit L3b to be corrected at the surface closest to the object side of the third lens sub-unit L3c to realize higher performance. Also, the aspheric surface is used in the first lens sub-unit L3a to accomplish higher performance. In addition, each of the first lens sub-unit L3a, the second lens sub-unit L3b, and the third lens sub-unit L3c is formed of a single lens to facilitate realization of a zoom lens with a small size and low cost.

In the present invention, one or more of the following conditions are satisfied:

| | |
|---|---|
| $0.8 < Dab/Dbc < 200$ | (1) |
| $025 < Db/Dbc < 100$ | (2) |
| $0.08 < Dab/f3 < 0.64$ | (3) |
| $0.71 < f3/f4 < 1.41$ | (4) |
| $0.64 < (3G3R2 + 3G3R1)/(3G3R2 - 3G3R1) < 1.64$ | (5) |
| $0.01 < (D12w + D23t)/BD2 < 0.84$ | (6) | where Dab represents a distance between the first lens sub-unit L3a and the second lens sub-unit L3b, Dbc represents a distance between the second lens sub-unit L3b and the third lens sub-unit L3c, Db represents a distance on the optical axis from the surface closest to the object side of the second lens sub-unit L3b to the surface closest to the image side of the second lens sub-unit L3b, fi represents a focal length of an i-th lens unit, and 3G3R1 and 3G3R2 represent paraxial radii of curvature of the object-side surface and the image-side surface in the positive lens 3G3, respectively. D12w represents a lens surface distance between the first lens unit L1 and the second lens unit L2 at the wide-angle end, D23t represents a distance between the second lens unit L2 and the third lens unit L3 at the telephoto end, and BD2 represents a distance on the optical axis from the surface closest to the object side of the second lens unit L2 to the surface closest to the image side of the second lens unit L2.

Next, technical meanings of the above conditions are described.

The condition (1) relates to the ratio of the distance between the first lens sub-unit L3a and the second lens sub-unit L3b to the distance between the second lens sub-unit L3b and the third lens sub-unit L3c. A value of the ratio exceeding the upper limit of the condition (1) is not suitable since the distance Dbc between the second lens sub-unit L3b and the third lens sub-unit L3c is extremely small as compared with the distance Dab between the first lens sub-unit L3a and the second lens sub-unit L3b (for example, when Dab=4.0, the upper limit is exceeded if Dbc=0.02) to make it difficult for the second lens sub-unit L3b to correct aberration produced in the first lens sub-unit L3a. At the same time, performance is significantly degraded due to axial displacement of the second lens sub-unit L3b and the third lens sub-unit L3c. More preferably, the upper limit of the condition (1) is set to 140, and further preferably, to 100. On the other hand, a value of the ratio less than the lower limit of the condition (1) is not suitable since the distance Dbc between the second lens sub-unit L3b and the third lens sub-unit L3c is extremely large (for example, when Dab=2.0, the lower limit is not reached if Dbc=2.5) to result in an increased size of the entire lens system. More preferably, the lower limit of the condition (1) is set to 1.1, and further preferably, to 1.6.

The condition (2) relates to the ratio of the distance on the optical axis from the surface closest to the object side of the second lens sub-unit L3b to the surface closest to the image side of the second lens sub-unit L3b to the distance between the second lens sub-unit L3b and the third lens sub-unit L3c. A value of the ratio exceeding the upper limit of the condition (2) is not suitable since the distance Dbc between the second lens sub-unit L3b and the third lens sub-unit L3c is small as compared with the thickness of the second lens sub-unit L3b (for example, when Db=0.2, the upper limit is exceeded when Dbc=0.02) to make it difficult for the surface closest to the object side of the third lens sub-unit L3c to correct aberration produced in the second lens sub-unit L3b. More preferably, the upper limit of the condition (2) is set to 70, and further preferably, to 50. On the other hand, a value of the ratio less than the lower limit of the condition (2) is not suitable since the distance Dbc between the second lens sub-unit L3b and the third lens sub-unit L3c is large (for example, when Db=0.5, the lower limit is not reached if Dbc=2.0) to result in an increased size of the entire lens system. More preferably, the lower limit of the condition (2) is set to 0.38, and further preferably, to 0.56.

The condition (3) relates to the distance between the first lens sub-unit L3a and the second lens sub-unit L3b. A large distance, which causes the ratio of Dab/f3 to exceed the upper limit of the condition (3), is not suitable since the third lens sub-unit L3 is extremely large and thus the entire lens system is increased in size. More preferably, the upper limit of the condition (3) is set to 0.49, and further preferably, to 0.34. On the other hand, a small distance, which causes the ratio of Dab/f3 to be less than the lower limit of the condition (3), is not suitable since performance is significantly degraded due to relative axial displacement of the first lens sub-unit L3a and the second lens sub-unit L3b. More preferably, the lower limit of the condition (3) is set to 0.10, and further preferably, to 0.12.

The condition (4) relates to the ratio of the focal lengths of the third lens unit L3 and the fourth lens unit L4. If the refractive power of the fourth lens unit L4 is so high as to cause the value of f3/f4 to exceed the upper limit of the condition (4), an increased number of lenses are used to constitute the fourth lens unit L4 in order to favorably correct aberration, which leads to an increase in the overall length of the lenses. More preferably, the upper limit of the condition (4) is set to 1.31, and further preferably, to 1.21. On the other hand, a low refractive power of the fourth lens unit L4, which causes the value of f3/f4 to be less than the lower limit of the condition (4), is not suitable since a moving amount for correcting the image surface in providing variable magnification or a moving amount for focusing is increased to result in an increase in the overall length of the lenses. More preferably, the lower limit of the condition (4) is set to 0.79, and further preferably, to 0.86.

The condition (5) relates to the lens shape of the positive lens 3G3 in the second lens sub-unit L3b. A value of (3G3R2+3G3R1)/(3G3R2−3G3R1) exceeding the upper limit of the condition (5) is not suitable since the lens of the image side surface of the positive lens 3G3 has an increased negative refractive power to increase spherical aberration on the positive side. More preferably, the upper limit of the condition (5) is set to 1.48, and further preferably, to 1.33. On the other hand, a value of the ratio less than the lower limit of the condition (5) is not suitable since the lens of the image side surface of the positive lens 3G3 has an increased positive refractive power to increase spherical aberration on the negative side. More preferably, the lower limit of the condition (5) is set to 0.71, and further preferably, to 0.79.

The condition (6) relates to the ratio of the sum of the distance between the first lens unit L1 and the second lens unit L3 at the wide-angle end and the distance between the second lens unit L2 and the third lens unit L3 at the telephoto end to the thickness on the optical axis of the second lens unit L2. The upper limit of the condition (6) is exceeded in a first case where the distance D12w or the distance D23t is large and a second case where the distance BD2 is small. In the first case, the distance between the second lens unit L2 and the lens unit immediately before or after the second lens unit L2 is extremely large to reduce the efficiency of variable magnification, thereby making it difficult to achieve a higher magnification. In the second case, sufficient space required for constituting the second lens unit L2 by a plurality of lenses is not ensured to cause difficulty in satisfactorily reducing aberration variations in providing variable magnification. More preferably, the upper limit of the condition (6) is set to 0.63 or 0.42, and further preferably, to 0.30 for a higher magnification. On the other hand, the lower limit of the condition (6) is not reached when the distance BD2 is large. A large distance BD2, which causes the value of (D12w+D23t)/BD2 to be less than the lower limit, is not suitable since the distance from the first lens unit L1 to the aperture stop SP is large to increase the diameter of the front element of the lens. For a smaller size of the front element, more preferably, the lower limit of the condition (6) is set to 0.02, and further preferably, to 0.04, to 0.08, or even to 0.16.

Next, numerical value data of Numerical Examples 1 and 2 corresponding to Embodiments 1 and 2, respectively, are shown. In each Numerical Example, i shows the order of an optical surface from the object side, ri the radius of curvature of an i-th optical surface (an i-th surface), di a distance between an i-th surface and the (i+1) surface, ni and νi the refractive index and the Abbe number of the material of an i-th optical member for the d line. Two surfaces closest to the image side correspond to the glass block G. In addition, f represents a focal length, FNo an F number, and ω half of the field angle.

An aspheric shape is represented by:

$$x = \frac{(1/R)h^2}{1+\sqrt{\{1-(1+k)(h/R)^2\}}} + Ah^2 + Bh^4 + Ch^6 + Dh^8 + Eh^{10}$$

where k represents the conic constant, A, B, C, D, E aspheric coefficients, x a displacement in the optical axis direction at a height h from the optical axis relative to the surface vertex, and R a paraxial radius of curvature. In addition, "e-xx" means "$\times 10^{-xx}$." Table 1 shows numerical values calculated with the aforementioned conditions in the respective Numerical Examples.

NUMERICAL EXAMPLE 1

| f = 4.86 to 46.73 | | FNo = 1: 1.85 to 2.43 | | 2ω = 57.4° to 6.5° | |
|---|---|---|---|---|---|
| r1 = | 45.439 | d1 = | 1.05 | n1 = 1.84666 | ν1 = 23.9 |
| r2 = | 21.972 | d2 = | 4.42 | n2 = 1.60311 | ν2 = 60.6 |
| r3 = | −175.910 | d3 = | 0.17 | | |
| r4 = | 18.527 | d4 = | 2.68 | n3 = 1.77250 | ν3 = 49.6 |
| r5 = | 49.994 | d5 = | variable | | |
| r6 = | 40.310 | d6 = | 0.60 | n4 = 1.84666 | ν4 = 23.9 |
| r7 = | 6.119 | d7 = | 2.00 | | |
| r8 = | −15.571 | d8 = | 0.60 | n5 = 1.77250 | ν5 = 49.6 |
| r9 = | 15.571 | d9 = | 1.70 | | |
| r10 = | 14.649 | d10 = | 2.27 | n6 = 1.84666 | ν6 = 23.9 |
| r11 = | −11.573 | d11 = | 0.07 | | |
| r12 = | −10.432 | d12 = | 0.60 | n7 = 1.77250 | ν7 = 49.6 |
| r13 = | 49.276 | d13 = | variable | | |
| r14 = | 9.009 | d14 = | 2.13 | n8 = 1.69350 | ν8 = 53.2 |
| | (aspheric surface) | | | | |
| r15 = | 146.263 | d15 = | 1.25 | | |
| r16 = | (stop) | d16 = | 2.62 | | |
| r17 = | 17.860 | d17 = | 0.60 | n9 = 1.84666 | ν9 = 23.9 |
| r18 = | 7.660 | d18 = | 0.45 | | |
| r19 = | 14.925 | d19 = | 1.34 | n10 = 1.60311 | ν10 = 60.6 |
| r20 = | −247.566 | d20 = | variable | | |
| r21 = | 11.668 | d21 = | 2.74 | n11 = 1.71300 | ν11 = 53.9 |
| r22 = | −9.023 | d22 = | 0.50 | n12 = 1.84666 | ν12 = 23.9 |

-continued

| f = 4.86 to 46.73 | | FNo = 1: 1.85 to 2.43 | | 2ω = 57.4° to 6.5° | |
|---|---|---|---|---|---|
| r23 = | −46.321 | d23 = | variable | | |
| r24 = | ∞ | d24 = | 2.40 | n13 = 1.51633 | ν13 = 64.1 |
| r25 = | ∞ | | | | |

| variable | focal length | | |
|---|---|---|---|
| spacing | 4.86 | 11.43 | 46.73 |
| d5 | 0.60 | 8.16 | 15.72 |
| d13 | 15.77 | 8.21 | 0.65 |
| d20 | 4.21 | 1.90 | 5.54 |
| d23 | 4.65 | 6.95 | 3.31 |

Aspheric Coefficient

| | K | 14-th Surface B | C | D | E |
|---|---|---|---|---|---|
| | −1.8605e−01 | 0.0000e+00 | −1.1849e−04 | −6.4358e−07 | 6.5716e−11 | −1.3436e−12 |

NUMERICAL EXAMPLE 2

| f = 4.30 to 41.98 | | FNo = 1: 1.85 to 2.78 | | 2ω = 55.2° to 6.1° | |
|---|---|---|---|---|---|
| r1 = | 31.535 | d1 = | 1.00 | n1 = 1.84666 | ν1 = 23.9 |
| r2 = | 15.053 | d2 = | 4.68 | n2 = 1.67790 | ν2 = 55.3 |
| r3 = | −80.859 | d3 = | 0.17 | | |
| r4 = | 11.782 | d4 = | 2.30 | n3 = 1.58913 | ν3 = 61.1 |
| r5 = | 25.562 | d5 = | variable | | |
| r6 = | 24.187 | d6 = | 0.50 | n4 = 1.88300 | ν4 = 40.8 |
| r7 = | 4.223 | d7 = | 2.00 | | |
| r8 = | −5.177 | d8 = | 0.50 | n5 = 1.69680 | ν5 = 55.5 |
| r9 = | 6.099 | d9 = | 1.75 | n6 = 1.84666 | ν6 = 23.9 |
| r10 = | −33.278 | d10 = | variable | | |
| r11 = | 7.877 | d11 = | 1.78 | n7 = 1.80610 | ν7 = 40.7 |
| | (aspheric surface) | | | | |
| r12 = | 53.544 | d12 = | 1.00 | | |
| r13 = | (stop) | d13 = | 1.00 | | |
| r14 = | 14.992 | d14 = | 0.60 | n8 = 1.84666 | ν8 = 23.9 |
| r15 = | 4.999 | d15 = | 0.02 | | |
| r16 = | 5.035 | d16 = | 2.41 | n9 = 1.48749 | ν9 = 70.2 |
| r17 = | −97.681 | d17 = | variable | | |
| r18 = | 9.539 | d18 = | 2.22 | n10 = 1.58313 | ν10 = 59.4 |
| | (aspheric surface) | | | | |
| r19 = | −13.174 | d19 = | 0.50 | n11 = 1.84666 | ν11 = 23.9 |
| r20 = | −19.776 | d20 = | variable | | |
| r21 = | ∞ | d21 = | 3.60 | n12 = 1.51633 | ν12 = 64.1 |
| r22 = | ∞ | | | | |

| variable | focal length | | |
|---|---|---|---|
| spacing | 4.30 | 10.18 | 41.98 |
| d5 | 0.60 | 5.67 | 10.73 |
| d10 | 10.72 | 5.66 | 0.59 |
| d17 | 4.92 | 2.46 | 5.49 |
| d20 | 3.08 | 5.53 | 2.50 |

Aspheric Coefficient

| K | A | B | C | D | E |
|---|---|---|---|---|---|
| | | 11-th surface | | | |
| −9.4136e−01 | 0.0000e+00 | 1.7496e−05 | 5.5948e−07 | 2.1673e−08 | 3.2009e−11 |
| | | 18th surface | | | |
| −8.6724e−01 | 0.0000e+00 | −1.3998e−04 | −9.0799e−07 | 7.5672e−08 | 9.7898e−11 |

TABLE 1

| Condition | Numerical example 1 | Numerical example 2 |
|---|---|---|
| (1) | 8.6 | 100 |
| (2) | 1.3 | 30 |
| (3) | 0.24 | 0.17 |
| (4) | 1.04 | 0.98 |
| (5) | 0.89 | 0.90 |
| (6) | 0.16 | 0.25 |

According to the zoom lenses of Embodiments 1 and 2 as described above, it is possible to realize a zoom lens which has a small size and high optical performance as the entire lens system, and at the same time, has a simple structure with a small number of constituent lenses. Particularly, it is possible to realize a zoom lens in which degradation of optical performance due to manufacture errors such as axial displacement of respective lenses is reduced.

Figure 9:
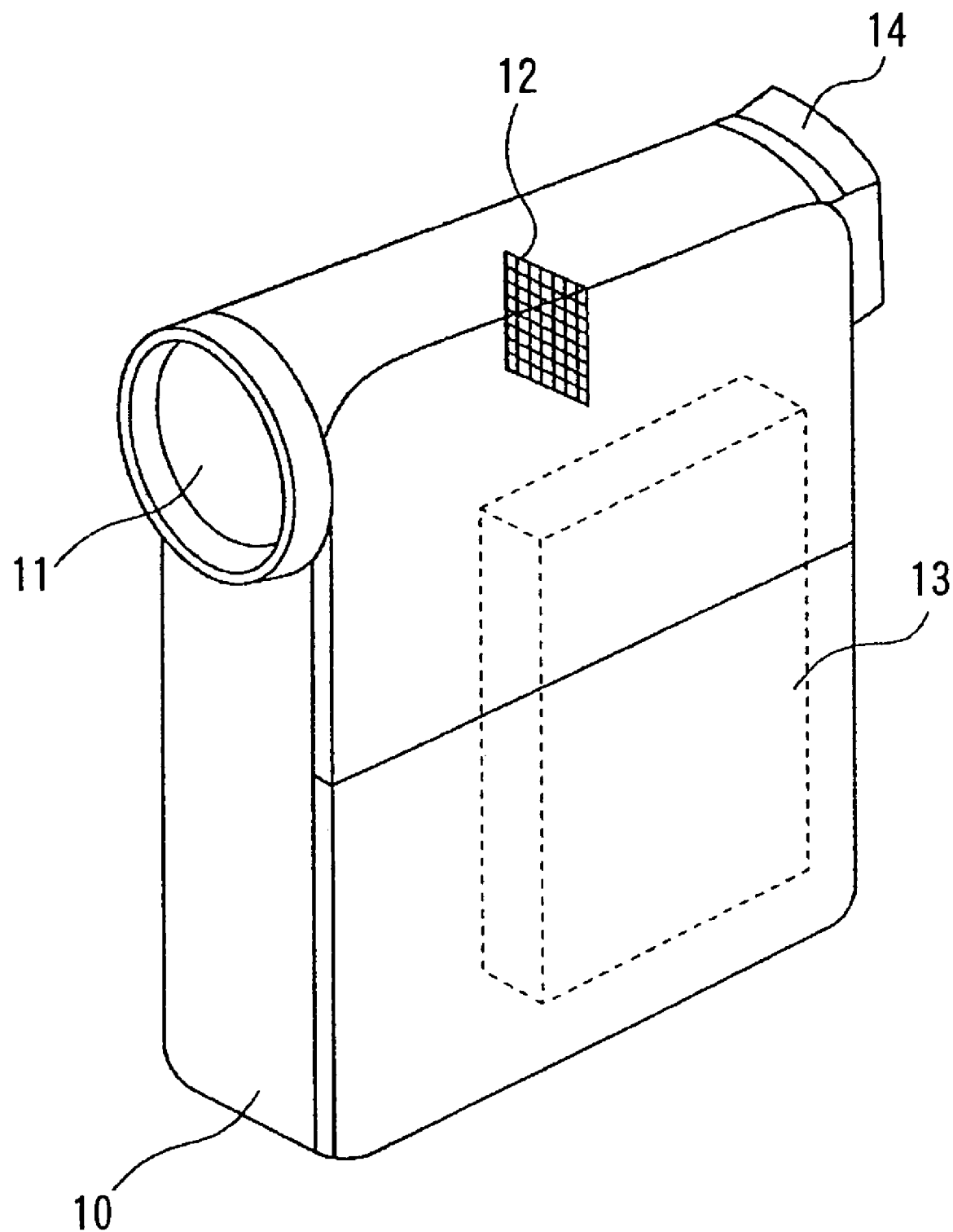
FIG. 9 is a schematic diagram showing main portions of a video camera.

Next, description is made for an embodiment of a video camera (an image-taking apparatus) which has the zoom lens of the present invention employed as an image-taking optical system with reference to FIG. 9.

In FIG. 9, reference numeral 10 shows a video camera body, reference numeral 11 shows an image-taking optical system formed of the zoom lens of the present invention, reference numeral 12 shows a solid-state image-pickup device (a photoelectrical conversion element) such as a CCD sensor or a CMOS sensor for receiving an object image produced by the image-taking optical system 11. Reference numeral 13 shows a memory which records object image information received by the solid-state image-pickup device 12 and converted into an electric signal, and reference numeral 14 shows a viewfinder for allowing a user to observe an object image displayed on a display element, not shown. The display element is formed of a liquid crystal panel or the like on which an object image formed on the solid-state image-pickup device 12 is displayed.

The zoom lens of the present invention is applied to an image-taking apparatus such as a video camera in this manner to realize an image-taking apparatus which has a small size and high optical performance.

While preferred embodiments have been described, it is to be understood that modification and variation of the present invention may be made without departing from scope of the following claims.

What is claimed is:

1. A zoom lens system comprising in order from an object side to an image side:

a first lens unit having a positive optical power;

a second lens unit having a negative optical power;

a third lens unit having a positive optical power, the third lens unit consisting of, in order from the object side to the image side, a first lens sub-unit having a positive refractive power and including a positive lens element with an object-side surface which has a convex shape, an aperture stop, a second lens sub-unit having a negative optical power and including a negative lens element with an image-side surface which has a concave shape, and a third lens sub-unit having a positive optical power and including a positive lens element; and a fourth lens unit having a positive optical power, wherein a distance between the respective lens units is changed during zooming, wherein the following condition is satisfied:

$$0.8 < Dab/Dbc < 200$$

where Dab represents a distance between the first lens sub-unit and the second lens sub-unit, and Dbc represents a distance between the second lens sub-unit and the third lens sub-unit, and wherein the following condition is satisfied:

$$0.64 < (3G3R2 + 3G3R1)/(3G3R2 - 3G3R1) < 1.64$$

where 3G3R1 and 3G3R2 represent paraxial radii of curvature of the object-side surface and an image-side surface of the positive lens element in the third lens sub-unit, respectively.

2. The zoom lens system according to claim 1, wherein the zoom lens system forms an image on a photosurface of a photoelectrical conversion element.

3. An image-taking apparatus comprising:

the zoom lens system according to claim 1; and a photoelectrical conversion element which receives an image formed by the zoom lens system.

* * * * *

UNITED STATES PATENT AND TRADEMARK OFFICE
CERTIFICATE OF CORRECTION

PATENT NO.        : 7,133,214 B2                                             Page 1 of 1
APPLICATION NO.   : 10/891621
DATED             : November 7, 2006
INVENTOR(S)       : Hoshi It is certified that error appears in the above-identified patent and that said Letters Patent is hereby corrected as shown below:

In the Specification:

In col. 4, line 62, please replace "025 < Db/Dbc < 100" to --0.25 < Db/Dbc < 100--.

Signed and Sealed this

Sixth Day of February, 2007

JON W. DUDAS
*Director of the United States Patent and Trademark Office*